United States Patent [19]

Matsuoka et al.

[11] Patent Number: 4,810,104
[45] Date of Patent: Mar. 7, 1989

[54] LINEAR GUIDE APPARATUS WITH BALL RETAINER

[75] Inventors: Masaki Matsuoka, Maebashi; Nobuyuki Osawa, Takasaki; Shinichi Kasuga, Maebashi, all of Japan

[73] Assignee: Nippon Seiko Kabushiki Kaisha, Tokyo, Japan

[21] Appl. No.: 187,510

[22] Filed: Apr. 28, 1988

[30] Foreign Application Priority Data

Apr. 30, 1987 [JP] Japan .................. 62-65573

[51] Int. Cl.$^4$ .................................. F16C 29/06
[52] U.S. Cl. ....................................... 384/45
[58] Field of Search ............... 384/45, 43, 44; 464/168

[56] References Cited

U.S. PATENT DOCUMENTS

| | | | |
|---|---|---|---|
| 1,750,140 | 3/1930 | Thompson | 384/45 |
| 4,441,765 | 4/1984 | Kasai et al. | 384/45 |
| 4,472,003 | 9/1984 | Osawa . | |
| 4,497,522 | 2/1985 | Szenger | 384/45 |
| 4,557,530 | 12/1985 | Haase | 384/45 |
| 4,647,226 | 3/1987 | Mottate | 384/45 |

FOREIGN PATENT DOCUMENTS 6010   1/1983   Japan .
116119  6/1986  Japan .

Primary Examiner—Lenard A. Footland
Attorney, Agent, or Firm—Basile and Hanlon

[57] ABSTRACT

A ball retainer made of wire is provided in a ball rolling path constituted by two opposing rolling grooves respectively formed in a side surface of a guide rail and in each inner surface of a slider for holding the balls inserted in the ball rolling path. The wire retainer includes a central straight portion, arcuate portions at both ends of the straight portion, and fixing portions respectively extending from the ends of the arcuate portions in parallel with the straight portion. The straight portion is accommodated in a wire escape channel formed in the bottom of the ball rolling groove of the guide rail, the arcuate portions are held in wire escape channels formed in end caps, and the fixing portions are fitted into wire holding holes formed in the end caps which are secured respectively to opposite ends of the slider.

2 Claims, 3 Drawing Sheets

LINEAR GUIDE APPARATUS WITH BALL RETAINER

BACKGROUND OF THE INVENTION

1. Field of the Invention

The present invention relates to a linear guide apparatus provided with infinite circulating paths of rolling balls interposed between a guide rail and a slider movable on the guide rail, and in particular, to a linear guide apparatus having a wire ball retainer for holding the balls.

2. Description of the Relevant Art

A linear guide apparatus of this type is disclosed, for example, in U.S. Pat. No. 4,472,003. In this linear guide apparatus, as shown in FIGS. 1 and 2, a slider 4 is formed with an axial recess 1, having a pair of axial ball rolling grooves 2 formed in the inner vertical surfaces of the recess 1 and axial through holes 3 bored laterally from and parallel to the ball rolling grooves 2. An elongate guide rail 10 has axial ball rolling grooves 9 respectively corresponding to the ball rolling grooves 2 of the slider 4. End caps 6 are respectively secured to opposite ends of the slider 4, and each of the end caps 6 has a semicircular ball path 5 for connecting the opposing ball rolling grooves 2 and 9 to the through hole 3 of the slider 4. Additionally, each end cap 6 has a return guide G of a semicircular shape fixed at the inside of the ball path 5. A multiplicity of balls 7 are filled rollably between the opposing ball rolling grooves 2 and 9, in the through holes 3 and ball paths 5. To hold the balls 7, a wire retainer 8 is provided.

When the slider 4 moves relative to the guide rail 1 in an axial direction, the balls 7 roll and circulate through the through hole 3, semicircular ball paths 5, and ball rolling grooves 2 and 9, and hence the slider 4 can travel smoothly in the axial direction due to the rolling of the balls 7.

The wire retainer 8 is provided for the purpose of preventing the balls 7 from falling off the ball rolling grooves 2 of the slider 4 when the slider 4 is removed from the guide rail 10. When the slider 4 is being fitted to the guide rail 10, the wire retainer 8 is accommodated in a wire escape channel 9a, formed in the bottom of the ball rolling groove 9, thereby preventing interference with the ball rolling groove 9 and ensuring the smooth rolling of the balls 7.

However, the wire retainer 8 of the prior art linear guide apparatus has semicircular bent portions 11 at opposite ends thereof, and the bent portions 11 are merely fitted into wire escape channels 5a formed in the semicircular ball paths 5 of the end caps 6 in order to hold the wire retainer 8. In such a structure, the fitting of the bent portions 11 of the wire retainer 8 to the wire escape channels 5a formed in the end caps 6 is not so rigid. As a result, problems have been experienced in that the wire retainer 8 tends to be loosened thus causing interference with the wire escape channel 9a, thereby disturbing the smooth rolling of the balls 7.

Furthermore, when the slider 4 is removed from the guide rail 10, the balls 7 fall off due to a shock imparted to the slider 4.

SUMMARY OF THE INVENTION

An object of the present invention is to provide a linear guide apparatus having a wire retainer which will not loosen.

In order to achieve this object, a linear guide apparatus in the present invention comprises an elongate guide rail having axial ball rolling grooves at both sides thereof. A slider main body is movably mounted on the guide rail and has ball rolling grooves respectively opposing to the ball rolling grooves of the guide rail. Additionally, the slider main body has axially extending through holes, in parallel with the ball rolling grooves, which serve as ball paths. A pair of end caps are respectively joined to opposite ends of the slider main body. Each of the end caps has a half-doughnut shaped ball circulating path and a ball scooping protrusion formed at an end of the ball circulating path. The ball scooping protrusion is configured to fit into the ball rolling groove of the guide rail, and a multiplicity of balls is rollably inserted in the ball rolling grooves. A wire retainer, for holding the balls, is provided for engagement with a wire holding hole formed axially in a base portion of the ball scooping protrusion of the end caps. The wire retainer has a guide portion including a straight portion and arcuate portions at opposite ends thereof, and fixing portions extending from the arcuate portions respectively in the axial direction in parallel therewith for inserting into the wire holding holes of the end caps.

The wire retainer is fixed to the end caps securely by inserting the fixing portions extending at opposite ends of the wire retainer into the wire holding holes of the end caps. As a result, the loosening of the wire retainer is not caused.

DESCRIPTION OF THE PREFERRED EMBODIMENT

Figure 1:
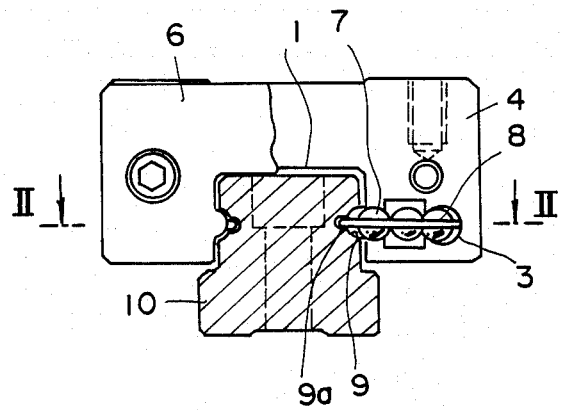
FIG. 1 is a front view, partially in section, of a prior art linear guide apparatus.
Figure 2:
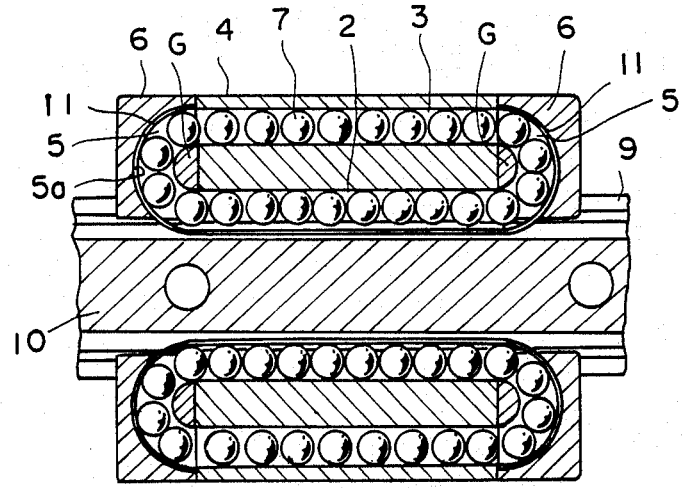
FIG. 2 is a sectional view taken along the line II—II of FIG. 1.
Figure 3:
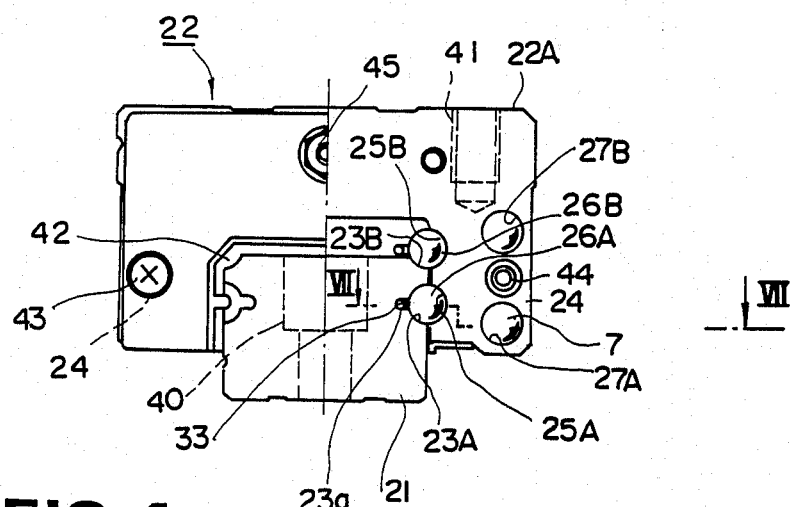
FIG. 3 is a front view, partially in section, of a linear guide apparatus of an embodiment of the present invention.
Figure 4:
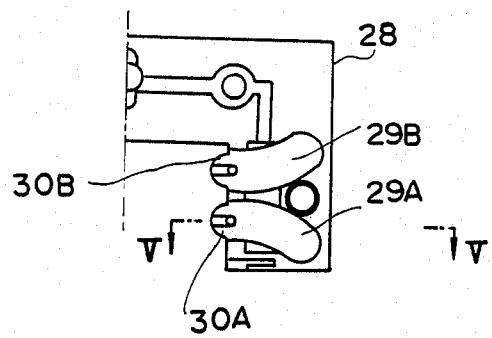
FIG. 4 is a partial rear view of an end cap employing the present invention.
Figure 5:
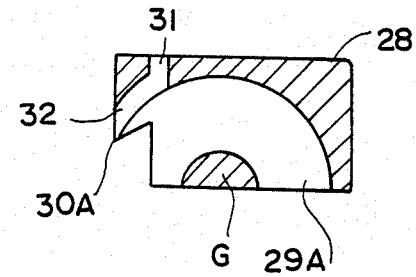
FIG. 5 is a sectional view taken along the line V—V of FIG. 4.
Figure 6:
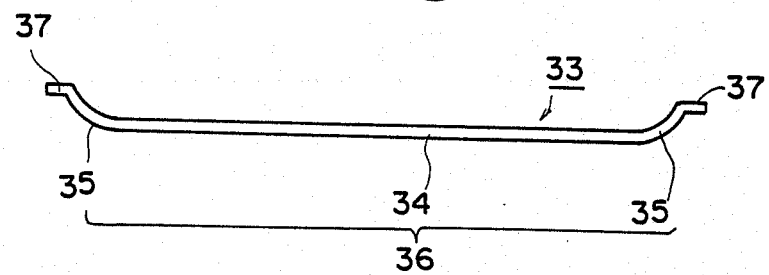
FIG. 6 is a side view of a wire retainer of the present invention.
Figure 7:
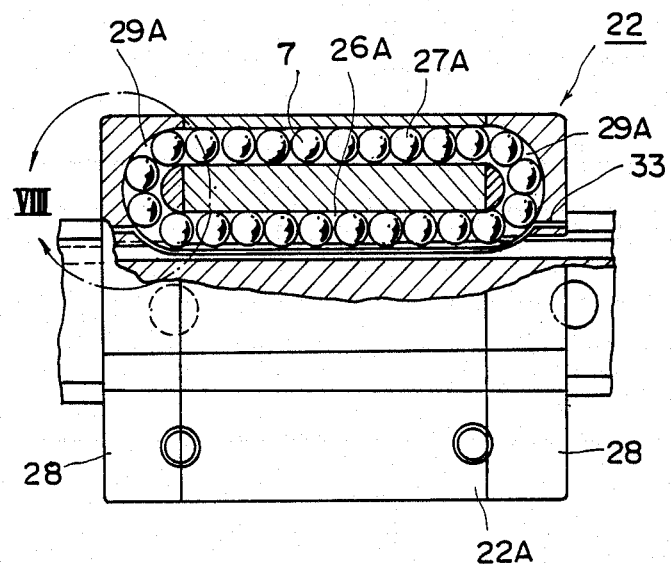
FIG. 7 is a plan view partially in section taken along the line VII—VII of FIG. 3.
Figure 8:
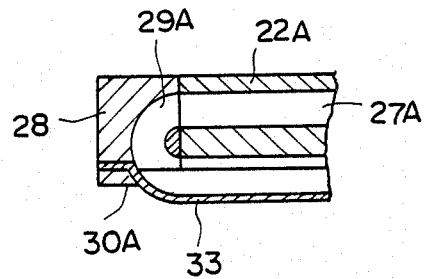
FIG. 8 is an enlarged view of portion VIII of FIG. 7.

FIGS. 3 to 8 illustrate an embodiment of the invention in which identical parts are designated with identical reference numerals. On a guide rail 21, a slider 22, as a sliding table having an inverted U-shaped cross section, is mounted in a straddling configuration thereon so as to be movable relative to rail 21. In each side of the guide rail 21, there is formed an axial ball rolling groove 23A, having a substantially V-shaped cross section. Additionally, a ball rolling groove 23B, having an arcuate cross section, is formed axially along a corner portion defined by the side surface and the uper surface of guide rail 21. A wire escape channel 23a is formed in the bottom of the ball rolling groove 23A along the axial direction.

Along the inner surface of each side wall of the main body 22A of the slider 22, are formed a ball rolling groove 25A and a ball rolling groove 25B, corresponding to the ball rolling grooves 23A and 23B of guide rail 21, respectively. A ball rolling path 26A comprises the opposing ball rolling grooves 23A and 25A, and a ball rolling path 26B comprises the opposing ball rolling grooves 23B and 25B. Furthermore, in each of the side walls of the slider main body 22A, there is formed ball passage hole 27A in parallel with the ball rolling path 26A and extending axially, and ball passage hole 27B in parallel with the ball rolling path 26B.

A pair of end caps 28, as end plates, are respectively joined to opposite ends of the slider main body 22A. Each of the end caps 28 has half-doughnut shaped ball circulating paths 29A and 29B formed therein aligned in the vertical direction. The ball circulating path 29A brings the ball rolling path 26A and the ball passage hole 27A in the slider main body 22A in communication with each other, and the ball circulating path 29B brings the ball rolling groove 26B and the ball passage hole 27B in the slider main body 22A in communication with each other.

An infinite circulating route is formed by the ball rolling path 26A, ball passage hole 27A, and ball circulating path 29A, and another infinite circulating route is formed by the ball rolling path 26B, ball passage hole 27B, and ball circulating path 29B. In these infinite circulating routes, there is disposed a multiplicity of balls 7.

In the end cap 28, the end portion of the half-doughnut shaped ball circulating paths 29A and 29B protrude to form ball scooping protrusions 30A and 30B having semicircular cross section. The extreme ends of the protrusions 30A and 30B have acute angles so as to be fitted respectively into the ball rolling grooves 23A and 23B of the guide rail 21. This structure is intended to bring the half-doughnut shaped ball circulating paths 29A and 29B as close as possible to the bottoms of the ball rolling grooves of the guide rail 21 when connected and to enable the protrusions 30A and 30B to scoop the balls 7 reliably thereby circulating the balls 7 smoothly.

The ball scooping protrusions 30A and 30B have, at the base portions thereof, wire holding holes 31 bored in the axial direction, and further, wire escaping channels 32 are formed to extend from the tips of the ball scooping protrusions 30A and 30B to the wire holding holes 31 respectively for the ball circulating paths 29A and 29B. In these wire escaping channels 32, as will be described later, arcute portions of a wire retainer 33 are fitted.

The wire retainer 33 has a ball guide portion 36 including a straight portion 34, for holding the balls 7 in the ball rolling grooves 25A or 25B, and arucate portions 35 at both ends of the straight portion 34. Fixing portions 37, of the wire retainer 33, extend from opposite ends of the arcuate portions 35 in parallel with the axial direction, and are fitted into the wire holding holes 31.

In addition, a bolt inserting hole 40, in guide rail 21, is provided for securing the guide rail 21 to a base table (not shown) or the like. Additionally, a threaded hole 41 for a bolt to secure a driven member such as a table or the like to the slider 22 is formed in the top surface of slider main body 22A. A wiper seal 42 made of synthetic rubber, is attached to the end cap 28 for wiping the ball rolling grooves 23A and 23B to prevent the intrusion of foreign matters, and it is formed by using a metal mold. Numeral 44 designates a threaded hole for a screw 43, and numeral 45 designates a grease nipple.

The operation of the above embodiment will be described relative to only one train of the balls 7. The similar description of the operation of other trains are omitted.

When the slider 22 on the guide rail 21 is moved in the axial direction, the balls 7, inserted in the ball rolling path 26A, roll with the movement of the slider 22, and move in a direction opposite to the direction of movement of the slider 22. At the end of the slider main body 22A, the balls 7 are guided by the ball scooping protrusion 30A to change direction, and make a U-turn along the ball circulating path 29A. Subsequently, the balls 7 pass through the ball passage hole 27A of the slider main body 22A and make a U-turn by the ball circulating path 29A of the end cap 28 at the opposite end of the slider main body 22A to return to the ball rolling path 26A. In this manner, the balls 7 circulate continuously.

The straight portion 34 of the wire retainer 33 is in the wire escape channel 23a at the bottom of the ball rolling grooves 23A, and the arcuate portions 35 at the opposite ends of retainer 33 are in the wire escape channels 32 formed in the end caps 28. Furthermore, the fixing portions 37 are fitted into the wire holding holes 31. As a result, the wire retainer 33 never shakes or becomes loose during rolling of the balls 7, which roll stably and circulate smoothly. Accordingly, the operation performance which has been the problem in the prior art can be improved to a great extent.

Furthermore, even when the slider 22 is removed from the guide rail 21, since the wire retainer 33 does not become loose, the balls 7 are held in place.

As described above, in the present invention, fixing portions 37 are formed to extend from opposite ends of the wire retainer 33 in parallel with the axial direction, and the wire retainer 33 is mounted by fitting the fixing portions 37 into the wire holding holes 31 formed in the base portions of the ball scooping protrusions 30A, 30B of the end caps 28. As a result, the wire retainer does not become loose as compared with the relevant art in which opposite ends of a wire retainer are bent in a semicircular form and the wire retainer is held by the spring force exerted by the bent portions. Accordingly, the advantage is provided in which the operation of the slider is very stable, and the balls do not fall off the wire retainer.

While certain embodiments of the invention have been described in detail above in relation to a linear guide apparatus will ball retainer, it will be apparent to those skilled in the art that the disclosed embodiment may be modified. Therefore, the foregoing description is to be considered exemplary rather than limiting, and the true scope of the invention is that defined in the following claims.

What is claimed is:

1. A linear guide apparatus comprising:
a guide rail extending in an axial direction and having axial ball rolling grooves respectively formed in opposite side surfaces,
a slider main body mounted movably on said guide rail straddling thereon and having ball rolling grooves formed in inner surfaces of side walls of said slider main body respectively opposing to said ball rolling grooves of said guide rail, said slider main body further having through holes as ball passages formed respectively in said side walls in parallel to said ball rolling grooves in said inner surfaces;

a pair of end caps respectively joined to opposite ends of said slider main body, each of said end caps having a half-doughnut shaped ball circulating path for connecting said ball rolling groove formed in said inner surface of said side wall to said through hole of said side wall through said ball circulating path, said each end cap having at one end of said ball circulating path a ball scooping protrusion which protrudes toward said ball rolling groove of said guide rail so as to be substantially fitted thereinto, said ball scooping protrusion having a wire holding hole formed in a base portion thereof in the axial direction;

A multiplicity of balls inserted rollably in said opposing ball rolling grooves of said guide rail and said slider main body, said half-doughnut shaped ball circulating paths, and said through holes; and a pair of wire retainers respectively for said pair of opposing ball rolling grooves of said guide rail and said slider main body for holding said balls, each of said wire retainers including a guide portion having a straight portion and arcuate portions at opposite ends of said straight portion, and fixing portions respectively extending further from said arcuate portions in parallel to the axial direction, said fixing portions being fitted into said wire holding holes of said end caps at opposite ends of said slider main body.

2. A linear guide apparatus according to claim 1, wherein said wire holding hole of said each end cap is in communication with a wire escape channel formed in said ball scooping protrusion.

* * * * *